United States Patent Office 3,309,247
Patented Mar. 14, 1967

3,309,247
AMMONIUM NITRATE EXPLOSIVE WITH POLY-
URETHANE RESIN PREPARED FROM NITRIC
ACID PARTIAL ESTERS
Harold F. Bluhm, Tamaqua, Pa., assignor to Atlas Chemical Industries, Inc., Wilmington, Del., a corporation of Delaware
No Drawing. Original application Sept. 17, 1962, Ser. No. 224,244, now Patent No. 3,256,214. Divided and this application Apr. 13, 1966, Ser. No. 565,342
2 Claims. (Cl. 149—8)

This is a division of application Serial Number 224,244, filed September 17, 1962 now Patent No. 3,256,214.

The present invention relates to a new type of explosive and in particular, to explosive resins comprised of crosslinked thermosetting polymers in which the explosive property is provided by nitric acid eater groups contained in a three-dimensional polymer system.

The resin products of the present invention are suited to be cured at room temperature. The products may be cast or molded to form explosive material in various shapes. The present products may be foamed to form low density explosive materials. The present products are useful as a matrix for other explosive materials and as a sensitive, water resistant coating for ammonium nitrate.

According to the present invention, a polyurethane resin is provided which contains at least about 4.5% by weight of nitrogen in the form of nitric acid eater groups. The polyurethane resin compositions of the present invention may be compounded by condensing a reaction mixture of a polyisocyanate with a compound furnishing hydrogen reactive with an isocyanate and containing a sufficient number of nitric acid eater groups to introduce at least about 4.5% by weight of nitrogen in the form of nitric acid ester nitrogen into said resin. The polyurethane resin compositions of the present invention may be compounded by condensing a reaction mixture of a polyisocyanate with either a nitric acid partial ester of a polyhydroxy compound, a nitric acid ester of an amino alcohol, or mixtures thereof, wherein the reaction mixture includes a component containing at least two radicals supplying hydrogen reactive with an isocyanate.

Suitable polyisocyanates which may be employed are: the diisocyanates such as hexamethylene diisocyanate, paraphenylene diisocyanate, metaphenylene diisocyanate, 4,4′ diphenylene diisocyanate, 1,5 napthlene diisocyanate, 4,4′ diphenylene methane diisocyanate, the toluene diisocyanates, 4,4′ diphenyl ether diisocyanate, 3,3′ dimethyl 4,4′ diphenyl diisocyanate, and 3,3′ dimethoxy 4,4′ diphenyl diisocyanate; the triisocyanates, such as 4,4′,4″-triphenyl methane triisocyanate, and 2,4,6, toluene triisocyanate, and the tetraisoyanates such as 4,4′ dimethyl diphenyl methane 2,2′, 5,5′ tetraisocyanate. Mixtures of compatible polyisocyanates may also be used. Because of availability and price the toluene diisocyanates such as the 2,4 toluene diisocyanate, 2,6 toluene diisocyanate, and blends of these diisocyanates are particularly preferred.

It will be noted that the reaction mixtures of the present invention include a polyisocyanate, a nitric acid eater and a component containing at least two radicals supplying hydrogen reactive with an isocyanate. The nitric acid eater may be the component that supplies the two reactive hydrogen radicals or the two reactive hydrogen radicals may be supplied by an additional component.

If a nitric acid partial ester of a polyhydroxy compound containing at least two available hydroxyl groups is utilized, a resin of the present invention may be prepared by condensing such an ester with a polyisocyanate. Suitable nitric acid partial esters of polyhydroxy compounds which contain at least two available hydroxyl groups, for example, are: mannitol tri- and tetranitrates, sorbitol tri- and tetranitrates, and anhydroenneaheptitol dinitrate.

If desired, a nitric acid ester having a single reactive hydrogen may be utilized. In such case, a third component having at least two reactive hydrogen radicals is required. The third component or crosslinking agent is adapted to become part of the resin matrix through a reactive hydrogen linkage with the nitric acid ester and the polyisocyanate. Suitable nitric acid esters having a single reactive hydrogen, for example, are: compounds having a single available hydroxy group such as, mannitol pentanitrate, sorbitol pentanitrate, and gylcerin dintrate. The third component requires two or more available hydrogen radicals reactive with an isocyanate group. Examples of compounds having available hydroxyl groups and suited to use as the third component are, gylcerol, ethylene, gylcol, polyethylene glycol, 1,4-butane glycol, sorbitol, mannitol, 1,6-hexamethylene glycol, ethylene and propylene oxide adducts of polyols.

In accord with the present invention, the reactive hydrogen is preferably supplied by a hydroxy group. Reactive hydrogen may be supplied by phenolic hydroxyl, amino, thiol, sulfinic or sulfonic acid groups, however the activity of such groups may undesirably speed the reaction resulting in an exothermic polymerization and fume-off of the nitric acid ester groups.

The sensitivity and explosive properties of the resin products of the present invention are dependent upon the amount of nitrogen present in the form of nitric acid ester groups. In order that the resin be impact sensitive, the present resins require at least about 4.5% by weight of nitrogen in the form of nitric acid ester groups compared to the total weight of the resin.

The resin compositions of the present invention may be prepared without a catalyst by simply mixing the components and allowing the mixture to set at room temperature. The setting or curing reaction may be speeded by warming. However, one of the advantages of the present invention is that the resin may be cured at a low temperature, well within the limits of stability of the nitric acid ester component. If a three component system is utilized, a prepolymer mixture may be formed by initially mixing the polyisocyanate component with the component supplying at least two radicals containing hydrogen reactive with an isocyanate. The nitric acid ester component may then be mixed with the prepolymer mixture and resultant mixture cured.

In general, the resin compositions of the present invention require no catalyst. However, the resin setting times may be speeded by the addition of small amounts of amines to the resin mixture. Suitable amine catalysts, for example, are di- and triethanol amine, diethylene triamine and dimethyl aniline.

The resins of the present invention are useful, per se, as explosives and as sensitive coating for ammonium nitrate blasting compositions. The resins of the present invention are particularly suited to processes utilizing explosives which are extruded or cast in rigid or flexible forms, such as metal forming processes. The present resins are also useful in the manufacture of booster and water resistant high explosives in which the resin supplies a matrix for a blasting agent such as ammonium nitrate or an explosive compound such as PETN (pentaerythritol tetranitrate) or RDX (cyclotrimethylene trinitramine).

The resin compositions of the present invention are eminently suited to produce thermosetting foamed resin explosives. The foamed resin explosives of the present invention may be formed by simply incorporating a gas forming substance, such as water, in the resin composition prior to the time the resin is cured.

The nature of the present invention is illustrated further by the following examples, which however, should not be construed to limit unduly the generally broad scope of the invention.

EXAMPLE I

A blend of an equal weight of anhydroenneaheptitol nitrate, containing 13.77% by weight of nitrogen, in the form of nitric acid ester, and 2,4-toluene diisocyanate were blended together to form a reaction mixture. No catalyst was added. The reaction product cured to a hard glass-like mass in 36 hours at normal room temperature. The nitrogen content, in the form of nitric acid ester nitrogen, of the product was calculated to be 6.9% by weight. The resin was found to be impact sensitive.

EXAMPLE II

A blend of 29.6 parts by weight of mannitol tetranitrate and 35.3 parts by weight of 10 polyoxyethylene sorbitol was mixed with 35.3 parts by weight of 2,4-toluene diisocyanate. No catalyst was added. The components formed a clear, liquid reaction mixture. After 16 hours the mixture cured to a hard-glass like resin which was found to be impact sensitive. The nitrogen content of the product, in the form of nitric acid ester nitrogen, was calculated to be 4.6% by weight.

EXAMPLE III

A blend of 66.7 parts by weight of mannitol pentanitrate and 4.9 parts by weight of ethylene glycol was mixed with 28.5 parts of 2,4-toluene diisocyanate. The mixture was placed in an aluminum dish and warmed by radiant heat to 50° C. After two hours, the resin cured to a rubber-like polymer. The heat source was removed and the curing continued at room temperature. After 24 hours, the mixture cured to a hard glass-like resin which was found to be impact sensitive. The nitrogen content, in the form of nitric acid ester nitrogen, was calculated to be 11.5% by weight.

EXAMPLE IV

The components of a resin in accord with Example II were blended and a 3 parts by weight of particulate ammonium nitrate mixed therein. No catalyst was added. The components formed a moldable reaction mixture containing particulate ammonium nitrate. After 16 hours, the mixture cured to a hard glass-like resin which was found to be impact sensitive.

EXAMPLE V

A tumbling barrel was charged with 100 parts by weight of dry particulate ammonium nitrate and 3 parts by weight of the liquid resin prepared in accord with Example II. The mixture was tumbled for 18 minutes at room temperature and one hour at 50° C. Tumbling was continued for one hour to cool the resin-coated particles. The resin coating had cured to a hard glass-like finish on the surface of the ammonium nitrate particles. The product was a water-resistant, resin-coated particulate ammonium nitrate.

EXAMPLE VI

A prepolymer mixture consisting of one part by weight of 10 polyoxyethylene sorbitol and 2 parts by weight of 2,4-toluene diisocyanate were heated at 70° C. in the absence of moisture until the viscosity of the mixture increased sufficiently to prevent free flow of the prepolymer at room temperatures. This took about 1 hour heating time.

50 parts by weight of prepolymer formed as described in the preceding paragraph and 50 parts by weight of mannitol pentanitrate were blended with one part by weight of silicone oil to obtain a viscous paste. The paste was slowly heated to a maximum of 70° C. while being agitated. The agitation was continued until a free flowing liquid was produced. The mixture was then cooled to room temperature and one part by weight of water mixed therein. The mixture containing the added water was then reheated to 70° C. An evolution of gas and a gradual increase in viscosity of the mixture was noted. The heating was continued until the mixture became stringy and an additional part by weight of water added. The resin mixture was then allowed to foam at room temperature. Although the foaming essentially ceased after about 2 hours, the raised resin remained tacky. After about 18 hours, a hard rigid foam was produced that had expanded to about 10 times the original volume of the liquid resin. The resin product was found to burn violently and to be impact sensitive.

EXAMPLE VII

The procedure of Example VI was repeated except that no silicone oil was added and the second water addition was omitted. After about 18 hours, the product cured to a hard rigid foam about 10 times the original volume of the liquid resin. The resin product burned violently and was found to be impact sensitive.

What is claimed is:
1. An explosive material comprising particulate ammonium nitrate embedded in a matrix of a polyurethane resin composition compounded by condensing a reaction mixture of a polyisocyanate and a member of the group consisting of nitric acid partial esters of polyhydroxy compounds, wherein the reaction mixture includes a component containing at least two radicals supplying hydrogen reactive with isocyanate.
2. An explosive material comprising particulate ammonium nitrate coated with a polyurethane resin composition compounded by condensing a reaction mixture of a polyisocyanate and a member of the group consisting of nitric acid partial esters of polyhydroxy compounds, wherein the reaction mixture includes a component containing at least two radicals supplying hydrogen reactive with isocyanate.

References Cited by the Examiner

UNITED STATES PATENTS

| | | | |
|---|---|---|---|
| 3,132,976 | 5/1964 | Klager et al. | 149—19 |
| 3,190,775 | 5/1965 | Ender | 149—8 |
| 3,245,849 | 4/1966 | Klager et al. | 149—19 |

CARL D. QUARFORTH, *Primary Examiner.*

B. R. PADGETT, *Assistant Examiner.*